US012615095B2

(12) United States Patent     (10) Patent No.:   US 12,615,095 B2

Levionnais et al.     (45) Date of Patent:    Apr. 28, 2026

(54) DEVICE AND METHOD FOR PROCESSING A NEAR-FIELD COMMUNICATION

(71) Applicant: ORANGE, Issy-les-Moulineaux (FR)

(72) Inventors: Philippe Michel Levionnais, Chatillon (FR); Olivier Lepetit, Chatillon (FR); Romain Huet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 299 days.

(21) Appl. No.: 18/262,650

(22) PCT Filed: Dec. 20, 2021

(86) PCT No.: PCT/FR2021/052404

§ 371 (c)(1),
(2) Date: Jul. 24, 2023

(87) PCT Pub. No.: WO2022/162290

PCT Pub. Date: May 4, 2022

(65) Prior Publication Data

US 2024/0080109 A1     Mar. 7, 2024

(30) Foreign Application Priority Data

Jan. 26, 2021    (FR) ...................................... 2100706

(51) Int. Cl.
*H04B 13/00*     (2006.01)
*H01Q 1/24*      (2006.01)
*H04B 5/00*     (2024.01)
*H04B 5/72*     (2024.01)

(52) U.S. Cl.
CPC ............. *H04B 13/005* (2013.01); *H04B 5/72* (2024.01)

(58) Field of Classification Search
None
See application file for complete search history.

(56) References Cited

U.S. PATENT DOCUMENTS

| | | | |
|---|---|---|---|
| 9,219,452 B2 * | 12/2015 | Stockinger | ............... H04B 1/18 |
| 9,692,525 B2 * | 6/2017 | Konanur | .............. H04B 13/005 |
| 9,913,077 B2 * | 3/2018 | Klabunde | ............ H04B 13/005 |

(Continued)

FOREIGN PATENT DOCUMENTS

| | | |
|---|---|---|
| WO | 2012131224 A1 | 10/2012 |
| WO | 2017093639 A1 | 6/2017 |
| WO | 2019211997 A1 | 11/2019 |

OTHER PUBLICATIONS

International Search Report dated May 10, 2022 for corresponding International Application No. PCT/FR2021/052404, filed Dec. 20, 2021.

(Continued)

*Primary Examiner* — Tuan A Tran
(74) *Attorney, Agent, or Firm* — David D. Brush; Westman, Champlin & Koehler, P.A.

(57) ABSTRACT

A method and device for processing a near-field communication. The device includes: at least one near-field communication antenna intended to receive a near-field electromagnetic signal and having at least one end; a switching member connected to the end of the antenna; and a controller able to receive the antenna signals and control the switching member. The switching member is able to disconnect the end of the antenna when it receives a first switching command, called an IBC command.

15 Claims, 3 Drawing Sheets

(56) References Cited

U.S. PATENT DOCUMENTS

| | | | |
|---|---|---|---|
| 10,009,071 B2 * | 6/2018 | Tanaka ..................... | H04B 5/26 |
| 10,321,406 B2 * | 6/2019 | Bostick ............... | H04B 13/005 |
| 10,693,526 B2 | 6/2020 | Levionnais et al. | |
| 11,955,810 B2 * | 4/2024 | Lee ................... | A61N 1/37229 |
| 2014/0213184 A1 * | 7/2014 | Matsubara .............. | H04B 5/26 |
| | | | 455/41.1 |
| 2015/0189463 A1 * | 7/2015 | Klabunde ................ | H04B 5/26 |
| | | | 455/41.1 |
| 2016/0294486 A1 * | 10/2016 | Bolin ................... | H04L 5/0048 |
| 2017/0272128 A1 | 9/2017 | Tanaka | |
| 2018/0242254 A1 * | 8/2018 | Bostick ............. | H04W 52/0251 |
| 2018/0351604 A1 | 12/2018 | Levionnais et al. | |
| 2020/0212961 A1 * | 7/2020 | Lee .......................... | H04B 5/77 |

OTHER PUBLICATIONS

Written Opinion of the International Searching Authority dated May 10, 2022 for corresponding International Application No. PCT/FR2021/052404, filed Dec. 20, 2021.

English translation of the Written Opinion of the International Searching Authority dated May 10, 2022 for corresponding International Application No. PCT/FR2021/052404, filed Dec. 20, 2021.

Texas Instruments "TRF7960, TRF7961 Multiple-Standard Fully Integrated 13.56-MHz RFID Analog Front End and Data-Framing Reader System" TRF7960, TRF7961, SLOU186G—Aug. 2006—Revised May 2017.

* cited by examiner

INT

CLF_A1

CLF_A2          1

CLF_P0          13

+V

ANT

14

VDD

IN    OUT    2

VC
VSS

7

0

CLF_A1

ANT

GR          CLF_A2

DEVICE AND METHOD FOR PROCESSING A NEAR-FIELD COMMUNICATION

CROSS-REFERENCE TO RELATED APPLICATIONS

This Application is a Section 371 National Stage Application of International Application No. PCT/FR2021/052404, filed Dec. 20, 2021, which is incorporated by reference in its entirety and published as WO 2022/162290 A1 on Aug. 4, 2022, not in English.

FIELD OF THE INVENTION

The invention relates in general to telecommunications, and more specifically to contactless communications using short-distance radio technologies, in particular of IBC (Intra-Body Communication) type. It applies more particularly to terminals equipped with hardware and software resources including a microprocessor and a near-field (NF) communication module receiving an electromagnetic field passing through the body of a user.

PRIOR ART

Near-field communications, usually called NFC, based mainly on the ISO (International Organization for Standardization) 14443 standard, use wireless technologies to allow information to be exchanged between two peripherals separated by a short distance, typically less than ten centimeters. Communications of this type have many applications in the fields of payment or transport, for example.

New wireless communication techniques using the human body as a channel have recently emerged in this field. In these technologies, which are grouped together under the generic term IBC (for Intra-Body Communication) or even BCC (for Body Channel Communication), the human body also acts as a conductor for transmitting information from one point to another. It is therefore no longer necessary to move the IBC terminal toward its counterpart in order to establish communication: it may be kept in a pocket, in a bag, etc. of the carrier. By moving their hand toward an NFC reader, the individual carrying the IBC terminal establishes secure communication between the reader and the terminal.

It is possible to receive such an electromagnetic signal on a conventional NFC component, associated with a conventional NFC antenna. The international patent application published under number WO2012/131224 describes a terminal comprising such an NFC component whose antenna enables the reception of IBC signals.

However, the signal received by the terminal in IBC mode is of lower quality than that which would be received in conventional NFC mode, for which the components of the NFC circuit have been optimized.

There is therefore a need for a terminal with efficient reception in IBC mode.

SUMMARY OF THE INVENTION

The invention aims to improve the prior art.

To this end, it proposes a near-field communication processing device comprising:

at least one near-field communication antenna intended to receive a near-field electromagnetic signal and comprising at least one end;

a switching member connected to said end of the antenna, a controller able to receive the antenna signals and control the switching member, the device being characterized in that the switching member is able to disconnect said end of the antenna when it receives a first switching command, called IBC command, from the controller.

Advantageously according to the invention, the device is a conventional NFC near-field circuit, such as those found for example in NFC cards or NFC-compatible mobile telephones on the market, additionally equipped with a switching member for switching the antenna to a state in which one of its ends is disconnected. Now, the NFC antenna, one end of which is disconnected, behaves like a wire antenna, and no longer like a loop antenna. Indeed, the study of IBC technology has made it possible to demonstrate that the human body reacts better to the electric component than to the magnetic component of the electromagnetic field carrying the IBC signal. Now, the NFC antennas of mobile terminals are conventionally antennas known as "loop" antennas. Such antennas pick up magnetic fields correctly, but pick up electric fields less well, unlike a wire antenna. Advantageously, the invention therefore makes it possible very simply to set the NFC circuit to IBC mode by disconnecting one of the ends of the antenna, the circuit thus being transformed into an IBC circuit, or IBC device.

An "antenna" is understood here to mean a conventional NFC antenna, intended for NFC communications. It consists of a set of turns of a number and arrangement suitable for receiving the near-field electromagnetic wave. The antenna is also conventionally associated with a controller, or NFC component (CLF for ContactLess Frontend) constituting a near-field communication module in the same way as an electromagnetic transponder and comprising software components (firmware, etc.) necessary for implementing NFC communications. The antenna transmits the received NF signals to the NFC component. Such an antenna conventionally comprises two terminals, or ends. At least one of its ends is connected to the NFC controller, and the other may be connected to the controller or to ground. By disconnecting this end, it is adapted by the device and the method of the invention to receive near-field signals via the human body with better quality in IBC mode.

"IBC", or IBC mode, is understood to mean near-field communication passing through the body of the user. The term is used as opposed to "NFC" mode, which corresponds to the standard mode of NFC communication, in which the terminal that comprises the NFC device (conventionally, a mobile terminal, or smartphone) is physically close to the NFC reader (for example, a payment terminal).

According to one particular mode of implementation of the invention, the processing device is characterized in that the switching member is additionally able to connect said end of the antenna when it receives a second switching command, called NFC command.

Advantageously according to this mode, the antenna may be connected or reconnected for standard NFC operation when it receives an NFC command, the antenna again behaving like a loop antenna. The device may thus be set, depending on the command received from the controller, either to NFC mode or to IBC mode. This is advantageous if the user wishes to use their terminal in one mode or the other (depending on the capabilities of the reader terminals facing it, the type of transaction, of environment, etc.).

According to one variant, the first and the second switching command are identical.

Advantageously according to this mode, a single command is used to switch the switching member, which behaves like a switch: if it is in closed mode, it opens upon receipt of the command, and vice versa. It is thus very simple to switch the device to an IBC or NFC mode: if it is set to NFC mode, receiving the command switches it to IBC mode, and vice versa.

According to another particular mode of implementation of the invention, said end of the antenna is connected to a ground before it is disconnected.

Advantageously according to this mode, one end of the NFC antenna is connected to ground, this corresponding to the majority of cases for NFC antennas on the current market, of loop type.

According to another particular mode of implementation of the invention, said end of the antenna is connected to the controller before it is disconnected.

Advantageously according to this mode, one end of the NFC antenna is connected to an input of the controller, this corresponding to some CLF/antenna assemblies on the current market.

According to another particular mode of implementation of the invention, said switching member is a transistor-based electronic switching system.

Advantageously according to this mode, a very simple switching system may be used. Indeed, it is well known to those skilled in the art of electronic components that one or more transistors, for example MOS transistors, may be simply arranged and driven so as to serve as a switch, or switching member, able to switch upon receipt of a switching command.

According to one example, the antenna comprises:
three turns (S1, S2, S3)
a turn width of 0.5 mm
an interturn width of 0.5 mm Advantageously according to this mode, the NFC antenna is better adapted to receiving IBC signals.

According to another particular mode of implementation of the invention, the controller is designed to control the connected position or the disconnected position on the basis of at least one characteristic of the electromagnetic field received by the antenna.

Advantageously according to this mode, the ratio between the electric component and the magnetic component of the received electromagnetic field may be analyzed by the controller, which deduces therefrom an NFC operating mode (if the magnetic component is predominant in the received signal) or an IBC operating mode (if the electric component is predominant in the received signal). The switching command may thus be issued automatically by the controller to the switching circuit, without the user being aware thereof.

According to another particular mode of implementation of the invention, the controller is designed to control the connected position or the disconnected position on the basis of information received in the electromagnetic signal.

Advantageously according to this mode, it is information carried in the electromagnetic signal, typically a field of a message received via this signal, that makes it possible to switch the antenna. In particular if such a field comprises an IBC message indication, the disconnected position will be controlled by the controller. If on the other hand the message received in the signal is a standard NFC message, the connected position will be controlled by the controller.

The invention also relates to a mobile terminal comprising such a near-field communication processing device.

Advantageously according to this mode, a mobile terminal equipped with a standard NFC module, modified into an IBC module according to the invention, by adding the switching circuit, is able to use IBC mode effectively and, according to some embodiments, is able to switch from an IBC mode to an NFC mode and vice versa, depending on how the user wishes to use their mobile.

The invention also relates, according to one embodiment, to such a terminal furthermore comprising a human-machine interface for allowing a user to enter an NFC or IBC switching command in order to transmit same to the processing device.

Advantageously according to this embodiment, the user is able to choose, on the human-machine interface of their terminal, for example via its touch screen (check box, menu, etc.), to set one mode or the other. This high-level command is transmitted to the processing device, the controller of which is able to relay the switching order to the switching member.

According to another aspect, the invention also relates to a method for processing near-field communication on a terminal comprising a near-field communication processing device comprising:

at least one near-field communication antenna intended to receive a near-field electromagnetic signal and comprising at least one end;
a switching member connected to said end of the antenna,
a controller able to receive the antenna signals and control the switching member,
the method being characterized in that it comprises a step of issuing a first switching command, called IBC command, to command the switching member to disconnect said end of the antenna.

According to one embodiment, such a method is characterized in that it furthermore comprises a step of issuing a second switching command, called NFC command, to command the switching member to connect said end of the antenna.

According to one embodiment, such a method is characterized in that the first and the second command are identical.

According to one embodiment, such a method is characterized in that it furthermore comprises:

a step of controlling the connected position or the disconnected position, on the basis of information received in the electromagnetic signal.

According to one embodiment, such a method is characterized in that it furthermore comprises:

a step of obtaining the mode to which the IBC component should be set;
a step of obtaining the current mode to which the processing device is set;
if the obtained mode is IBC, and the current mode is NFC, issuing an IBC switching command;
if the obtained mode is NFC, and the current mode is IBC, issuing an NFC switching command.

The invention also relates to a computer program comprising instructions for implementing the above method according to one of the particular embodiments described when said program is executed by a processor of the controller.

The invention also relates to a computer program comprising instructions for implementing the above method according to one of the particular embodiments described when said program is executed by a processor of a mobile terminal comprising the processing device.

The methods may be implemented in various ways, in particular in hard-wired form or in the form of software. These programs may use any programming language, and be in the form of source code, object code, or of intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from an Internet network.

As an alternative, the recording media may correspond to an integrated circuit in which the program is incorporated, the circuit being designed to execute or to be used in the execution of the method in question.

This method and these computer programs have features and advantages that are analogous to those described above in relation to the near-field communication processing device.

LIST OF THE FIGURES

Other features and advantages of the invention will become more clearly apparent on reading the following description of particular embodiments, which are provided by way of simple illustrative and non-limiting examples, and the appended drawings, in which.

DESCRIPTION OF ONE EMBODIMENT OF THE INVENTION

General Principle of the Invention

The general principle of the invention is that of adapting, on a terminal, the antenna associated with the NFC controller in order to transform the assembly into an IBC reception circuit (or device), in order to initiate wireless communication using the human body as a channel. In IBC mode, the quality of the received signal is better than if the antenna were not adapted.

The general idea of the invention is therefore to modify the NFC component of the mobile so that it is set to IBC mode by adapting the antenna associated with the component so as to favor the electric field at the expense of the magnetic field. To do this, it is sufficient to open the antenna circuit, in particular but not exclusively by disconnecting one of its ends, which is connected for example to ground or to the controller. The operation remains reversible in order to ensure compatibility with NFC mode if the user wishes to leave IBC mode to return to NFC mode: this requires only closing the antenna circuit again.

Particular Embodiments of the Invention

Figure 1:
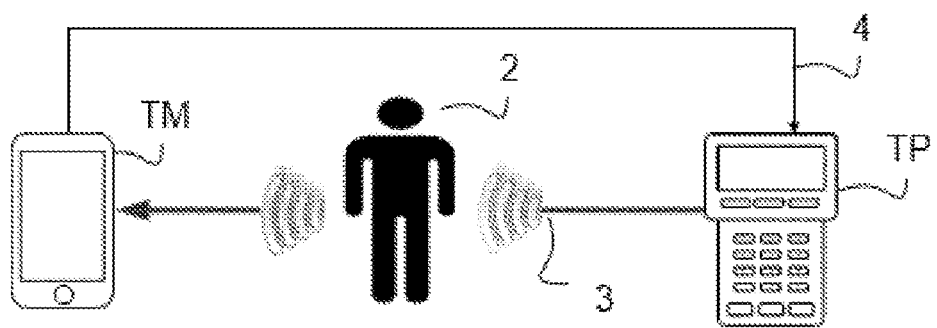
FIG. 1 illustrates the general context of IBC communication according to the prior art.

FIG. 1 illustrates the general context of IBC communication according to the prior art. In this context, with the NFC circuit not having been adapted according to the invention, an IBC transaction is possible, but, since the reception is of poor quality, it is more difficult to set up.

In this example, the user (2) carrying the terminal TM equipped with an NFC module approaches until almost touching the reader terminal TP in order to implement a service, for example a monetary transaction. The user (2), or carrier, is for example a human being, but could alternatively take the form of another living being able to perform an intentional gesture toward the reader and to transmit radio carrier waves. The terminals TP and TM are able to communicate directly in near-field mode (NFC mode) or via an electromagnetic field (NF) using the body of the user (IBC mode).

The reader TP may be for example an EPT (for Electronic Payment Terminal), or else a mobile terminal having an NFC module set to reader mode, a connected object (IoT), a personal computer, etc. It is able to transmit NFC radio signals (3) via an NFC antenna (not shown). In this example, the reader (TP) comprises a surface formed by the antenna, which is possibly protected and designed to react when the user touches it or enters into proximity therewith, for example by moving their hand close. The term "surface" is in no way limiting and is given by way of illustration, the antenna being the only means essential to the operation of the device.

The terminal TM comprises a conventional NFC component (CLF associated with an antenna). It is for example a mobile telephone, or smartphone, or else a connected object.

In a "conventional" NFC mode, the carrier conducts their transactions by physically moving the terminal toward the reader. It will be recalled that NFC communications may cover two types of applications related to two different operating modes on an NFC terminal: the first mode, called emulation mode, emulates a near-field communication module in order to secure electronic transactions between an application stored on the terminal and an external reading terminal; in the context illustrated here, the terminal is in this mode; the second mode, called reader mode, relates to the reading of data on transponder devices, or NFC cards; this is the reader mode (tag reading) as defined by the NFC Forum (industrial body responsible for promoting the implementation and standardization of NFC technology).

In an IBC mode, the NFC module of the terminal, set to emulation mode, behaves like a device naturally able to receive radio carrier waves, via an antenna, through the body of the user (2). To this end, the terminal TM is located in the immediate proximity of the user (2), without necessarily being in direct contact therewith. For example, the terminal is placed inside a pocket or a bag carried against the user, or around their neck. In these configurations, it is estimated that the terminal is not more than a few centimeters away from the body of the user (2). The distance is for example less than 5 cm. The dialog is initiated between the reader and the terminal on the IBC channel, when the mobile terminal TM receives the wave carrying the initialization message transmitted by the reader TP and relayed by the body of the user. This is followed by the establishment of bidirectional communication using a radio link, for example Bluetooth (4), as described in document WO2017/093639, included here by reference. Indeed, it is not possible to retransmit a complex message to the reader via the body of the user, for data rate and power reasons. Indeed, the terminal operates in load modulation mode, that is to say through induction. The 14443 standard indicates that, in such a situation, the mobile terminal in emulation mode and the reader terminal are no longer able to communicate if they are separated by more than around 10 cm.

The use of a conventional NFC component makes it possible to receive IBC signals on the terminal TM. However, these are not of good quality, unless considerably increasing the current that is induced through a higher power of the signal, which is unnecessary, expensive, and could prove dangerous to the body carrying the signal. Indeed, the NFC or IBC electromagnetic wave has two main vector components, magnetic and electric. It is on the basis of these two components that the electromagnetic wave moves. Experience acquired on IBC technology has made it possible to demonstrate that the human body reacts better to the electric field than to the magnetic field. More specifically, the human body transmits electrical signals with better efficiency if they are emitted with an electric antenna. This phenomenon is attributed to the fact that the human body consists mainly of water and, as such, is closer to electric antennas. An electric field is thus better transmitted by the individual. Now, the NFC antennas of existing mobile terminals are conventionally what are called "loop" antennas, which are efficient when good directivity is desired. Such magnetic antennas are able to pick up electric fields, but the quality of the received signals is poor. The invention therefore proposes to modify this antenna to make it more efficient in IBC mode.

Figure 2:
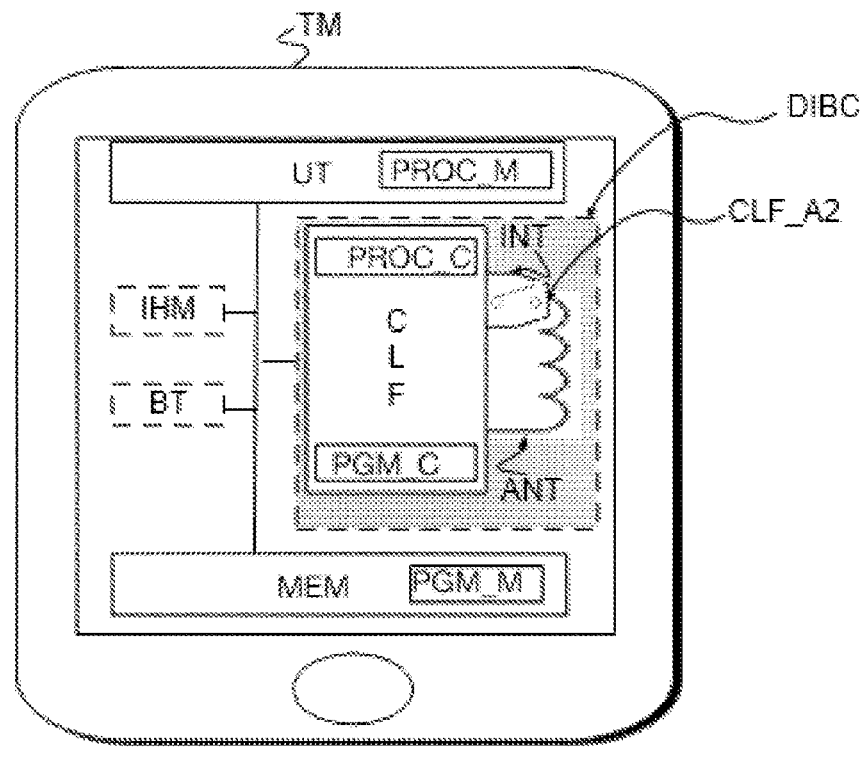
FIG. 2 illustrates a mobile terminal comprising a processing device according to one particular embodiment of the invention.

FIG. 2 illustrates an architecture of a mobile terminal comprising a processing device (DIBC) according to one particular embodiment of the invention.

The terminal TM has the conventional architecture of a smartphone-type mobile telephone, and comprises in particular a memory MEM, a processing unit UT, equipped for example with a processor PROC_M, and driven by the computer program PGM_M stored in memory MEM. On initialization, the code instructions of the computer program PGM_M are for example loaded into a memory, before being executed by the processor PROC_M. The processor PROC_M of the processing unit UT in particular implements the steps of the method for processing IBC near-field communication according to some of the particular embodiments, according to the instructions of the computer program PGM_M. In particular, the program PGM_M may relay a choice by the user, made on the human-machine interface of the terminal, to switch between an IBC mode and an NFC mode.

The terminal also comprises a module DIBC for initializing IBC communications. This module conventionally comprises a contactless communication integrated circuit, or CLF (for Contactless Front-End) and an antenna ANT initially intended to receive NFC signals and adapted according to the invention to receive IBC signals via the human body. The CLF component itself comprises a processor PROC C able to implement a low-level program (for example, in assembler) so as to drive the CLF and the modules that are connected thereto, in particular, according to one embodiment, a changeover switch INT that is connected thereto. The principle of this driving is to adapt the NFC magnetic antenna of the mobile so that it is able to receive the electric component with better efficiency. Such antennas are what are called "loop" antennas, as explained above, whose two ends are connected to the CLF. One of them is generally connected to ground and the other to the output of the transmission module. According to other implementations, the two terminals are connected to the CLF. To carry out the IBC adaptation, the end of the NFC antenna is disconnected, so as to leave it "floating" by virtue of the switch, or changeover switch INT. From a practical point of view, this takes the form of a software command issued by the program PGM_C from the CLF to the changeover switch INT, which may for example be a (C)MOS transistor-based electronic circuit, able to open so as to disconnect the end of the antenna. When this end is not connected (for example to ground), it becomes a wire antenna optimized for IBC communications; conversely, if it is connected (for example to ground), it becomes a loop antenna again, optimized for NFC communications.

The terminal also comprises a communication module distinct from the NFC module, for example Bluetooth (or Wi-Fi, Li-Fi, etc.), denoted BT in the figure, in order to provide the return channel, and therefore ensure the bidirectional nature of the communication.

Optionally, the terminal also comprises a human-machine interface, or HMI, which may enable it in particular to accept an input from the user, and to translate it, via the program PGM_M of the terminal, into instructions for the program PGM_C of the CLF: command to switch to IBC mode, or to return to NFC mode.

Figure 3:
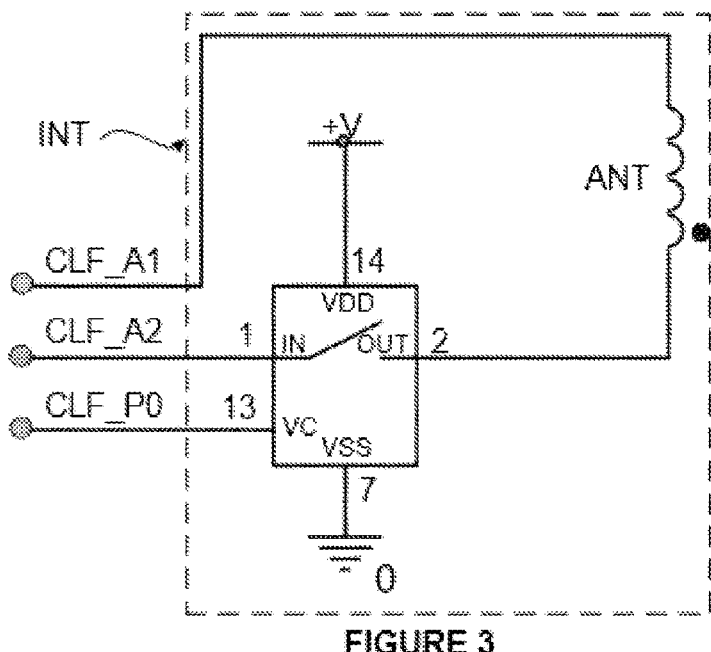
FIG. 3 illustrates an electronic switching system for the processing device according to one particular embodiment of the invention.

FIG. 3 illustrates an electronic switching system for the processing device according to one particular embodiment of the invention.

The changeover switch, or switch INT shown in FIG. 3 comprises a programmable switching component, according to this example an analog switch called "TLC4066" from Texas Instruments®, based on a quadruple silicon-gate CMOS, and designed to manage both analog and digital signals. A voltage command (for example a positive voltage equivalent to the binary value 1) applied to a section of the changeover switch turns on the associated switch. In the example shown in FIG. 3, applying a voltage command to the input 13 (VC) makes it possible to close the changeover switch, whereas the opposite command opens it.

The connections CLF_A2 and CLF_A1 correspond to two inputs of the controller CLF, respectively. In the context of this embodiment of the invention, CLF_A1 is connected to one terminal of the antenna ANT, and CLF_A2 is connected to the other terminal of the antenna ANT when the changeover switch is closed (IN=OUT). When the changeover switch is open, CLF_A2 is no longer connected to the antenna ANT, and the terminal of the antenna is therefore disconnected, also referred to as "floating". The voltage command applied to the input denoted CLF_PO makes it possible, by opening the switch, to disconnect the input CFL_A2 from the component, and therefore the corresponding terminal of the antenna, thus setting it, as explained above, to IBC reception mode.

Such a voltage is conventionally applied at the processor PROC C of the CLF, by an instruction of the program PGM_C of the type Set port0 reg XX=1, where:

"Port0" indicates the port number

"Reg XX" indicates the value to be applied to the register of the port in question When the switch is closed, the antenna again behaves like a loop antenna able to receive NFC signals.

Figure 4:
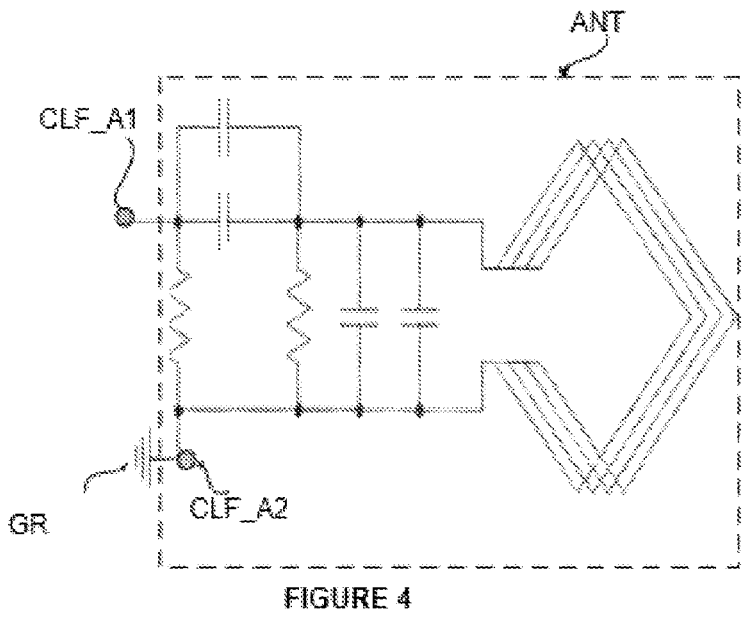
FIG. 4 illustrates a switched-antenna electronic system for the processing device according to another particular embodiment of the invention.

FIG. 4 illustrates a switched-antenna electronic system for the processing device according to another particular embodiment of the invention.

The antenna that is shown is a conventional NFC antenna, intended to be connected to a CLF, well known to those skilled in the art. For example, reference will be made to the specification entitled "*TRF7960, TRF7961 Multiple-Standard Fully Integrated* 13.56-*MHz RFID Analog Front End and Data-Framing Reader*" from the aforementioned Texas Instruments, which describes and outlines CLFs associated with an NFC antenna. The antenna diagram in FIG. 4 is extracted from that document, section 7.1.

According to this embodiment of the invention, as in the example of FIG. 3, the connection CLF_A1 of the controller is connected to a terminal of the antenna. On the other hand, the other terminal of the antenna is connected via the switch to a ground, to comply with the antenna diagram. Thus, opening the changeover switch disconnects the terminal CLF_A2 of the antenna from ground GR, and connects it to ground when the changeover switch is closed.

Figure 5:
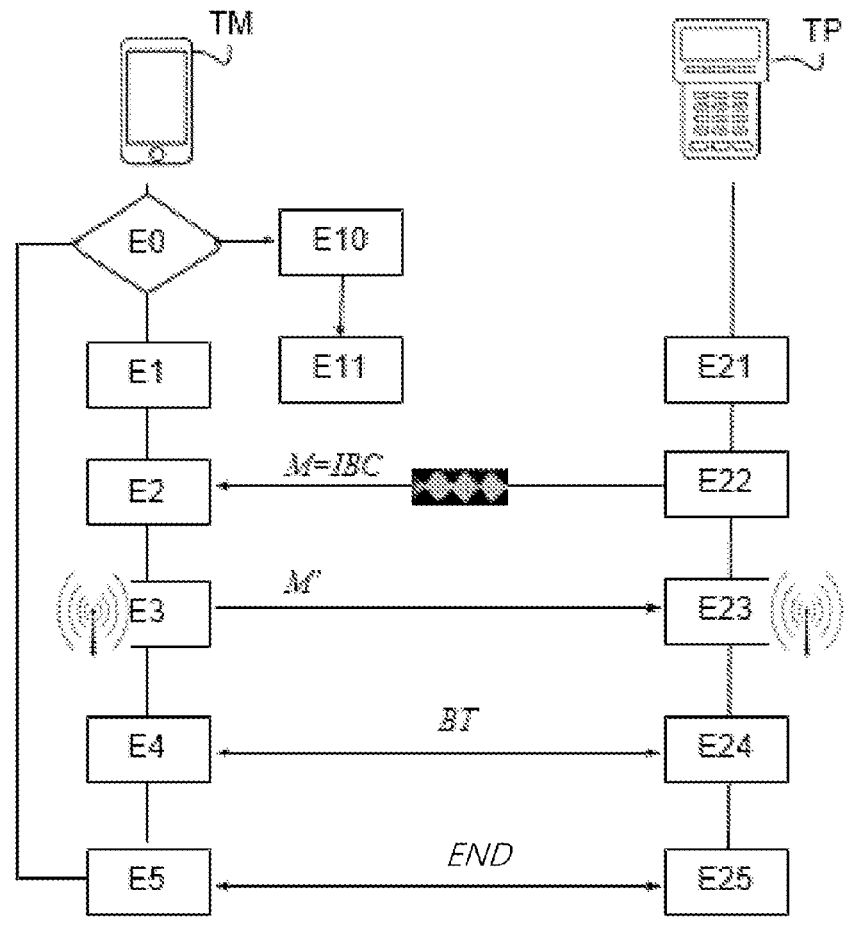
FIG. 5 illustrates steps of a method using one embodiment of the invention.

FIG. 5 illustrates steps of the method for processing near-field communication according to one embodiment of the invention. In this embodiment, it is assumed that the user is able to use their terminal in IBC mode or in NFC mode.

In a step E0, a test is therefore performed to ascertain whether the terminal should be set to NFC mode or to IBC mode. This test may be performed by an application of the mobile terminal, in connection with the program PGM_M, for example an applet inviting the user, via the human-machine interface, to choose their type of transaction, or any other program able to make a decision about the transaction or the set of transactions to be performed in near-field mode, of NFC or IBC type.

If the test concludes as to an NFC mode, step E0 is followed by a step E10 of setting the antenna to NFC mode, that is to say closing the loop antenna by reconnecting one of its ends if necessary by sending an NFC switching command. Naturally, if the device DIBC is already in NFC mode, this reconnection is unnecessary. If this command is necessary to set the terminal back to NFC mode, it is transmitted for example from the program PGM_M to the program PGM_C of the CLF, which commands the switch INT to open, as explained above with reference to FIGS. 3 and 4.

Step E10 is then followed by step E11 of performing the NFC transaction, which will not be described further below as it is entirely conventional.

If on the contrary the test (or interrogation of the user via the human-machine interface) concludes as to an IBC mode, step E0 is followed by a step E1 of setting the antenna to IBC mode, that is to say opening the loop antenna by disconnecting one of its ends by sending an IBC switching command. Naturally, if the device DIBC is already in IBC mode, this disconnection is unnecessary, because it has already been performed beforehand. If this command is necessary to set the terminal back to IBC mode, it is transmitted for example from the program PGM_M to the program PGM_C of the CLF, which commands the switch INT to open, as explained above with reference to FIGS. 3 and 4. Step E1 may thus, according to one example, comprise the following sub-steps:

Interrogating the memory of the mobile terminal to ascertain the mode to which the component DIBC is set, or interrogating the CLF to ascertain the current mode of the switch, via for example a command of the type get port0 reg XX If the terminal/device DIBC is already in IBC mode, not doing anything;

If not, transmitting a command to open the switch to the CLF.

Step E1 is then followed by step E2 of initiating the IBC transaction. The dialog is initiated between the reader and the terminal. Such dialog, followed by the establishment of bidirectional communication using a return channel, for example a Bluetooth link, is described in document WO2017/093639 mentioned previously. It includes in particular, in a step E22, the reader TP broadcasting a near-field (NF) invitation message M possibly comprising parameters in relation to the service offered (service identifier, unknown, which will make it possible in particular to perform Bluetooth pairing, etc.), receiving this message in a step E2, when the user moves toward the reader and thereby authorizes the transmission of the wave carrying the message M through their body, the terminal processing the message M during this step E2 (demodulation of the received electrical signal into a digital signal, decoding of the unknown, initialization of Bluetooth communication, etc.), transmitting, in a step E3, the response message M' on the Bluetooth radio channel. Next, if the reader is able to accept Bluetooth communication with the terminal, establishing a bidirectional Bluetooth channel and communicating on this channel in steps E4 and E24, in order to receive/transmit messages in relation to the IBC transaction on the Bluetooth channel (to validate a payment, a voucher balance, or exchange any other message required for communication, etc.).

Step E25/E5 corresponds to the end of the transaction (for example, validation of the monetary transaction, opening of the gate, etc.). The Bluetooth channel may be closed again and the method on the mobile may return to step E0, waiting for an instruction to set to IBC or NFC mode for another transaction, or group of transactions.

It goes without saying that the embodiment that has been described above has been given purely by way of wholly non-limiting indication, and that numerous modifications may easily be made by those skilled in the art without, however, departing from the scope of the invention.

In particular, IBC mode may be set by default on the terminal. Indeed, a user who has IBC no longer needs NFC mode, since it is more practical to leave the terminal in their pocket than to hold it in their hand. It is only if the user wishes to perform an NFC transaction that they will have to set their terminal back to this mode. The most practical mode is thus offered by default, without losing compatibility with NFC mode.

The invention claimed is:

1. A near-field communication processing device comprising:

at least one near-field communication antenna intended to receive a near-field electromagnetic signal and comprising a first end;

a switching member connected to said first end of the antenna; and a controller able to receive signals from the antenna and control the switching member, the switching member being configured to disconnect said first end of the antenna from a ground, so that said first end is floating, in response to receiving a first switching command, called an Intra-Body Communication (IBC) command, from the controller, and the switching member being arranged, when the switching member is closed, to connect said first end of the antenna to the ground.

2. The near-field communication processing device as claimed in claim 1, wherein the switching member is configured to connect said first end of the antenna in response to receiving a second switching command, called a Near Field Communication (NFC) command.

3. The near-field communication processing device as claimed in claim 2, wherein the first switching command and the second switching command are identical.

4. The near-field communication processing device as claimed in claim 1, wherein said switching member comprises a transistor-based electronic switching system.

5. The near-field communication processing device as claimed in claim 1, wherein the controller is designed to control a connected position or a disconnected position on the basis of at least one characteristic of the electromagnetic field received by the antenna.

6. The near-field communication processing device as claimed in claim 5, wherein the controller is designed to control the connected position or the disconnected position on the basis of information received in the electromagnetic signal.

7. A mobile terminal comprising a near-field communication processing device as claimed in claim 1.

8. The mobile terminal as claimed in claim 7, furthermore comprising a human-machine interface for allowing a user to enter the NFC or IBC switching command in order to transmit the switching command to the near-field communication processing device.

9. A method for processing near-field communication on a terminal comprising a near-field communication processing device, the method comprising:

receiving a near-field electromagnetic signal by at least one near-field communication antenna comprising a first end;

in response to the at least one near-field antenna receiving the near-field electromagnetic signal, issuing by a controller a first switching command, called an Intra-Body Communication (IBC) command, to a switching member, which is connected to said first end of the antenna, the switching member being arranged, when the switching member is closed, to connect said first end of the antenna to the ground; and in response to the IBC command, the switching member disconnecting the first end of the at least one near-field communication antenna from the ground so that the first end is floating.

10. The method as claimed in claim 9, comprising issuing by the controller a second switching command, called a Near-Field Communication (NFC) command, to command the switching member to connect said first end of the antenna.

11. The method as claimed in claim 10, wherein the first and the second commands are identical.

12. The method as claimed in claim 9, comprising:

the controller controlling a connected position or a disconnected position of the switching member, on the basis of information received in the electromagnetic signal.

13. The method as claimed in claim 9, comprising:

obtaining a mode to which the near-field communication processing device should be set;

obtaining a current mode to which the near-field communication processing device is set;

if the obtained mode is IBC, and the current mode is NFC, issuing an IBC switching command;

if the obtained mode is NFC, and the current mode is IBC, issuing an NFC switching command.

14. A non-transitory computer readable medium comprising a computer program product comprising program code instructions for implementing the method as claimed in claim 9 when the instructions are executed by a processor of the terminal or of the near-field communication processing device.

15. A non-transitory computer readable medium as claimed in claim 14, wherein the instructions are executed by the processor of the near-field communication processing device.

* * * * *